Nov. 9, 1965
C. G. JOHN
3,216,517
FORCE MEASURING DEVICE
Filed April 30, 1964
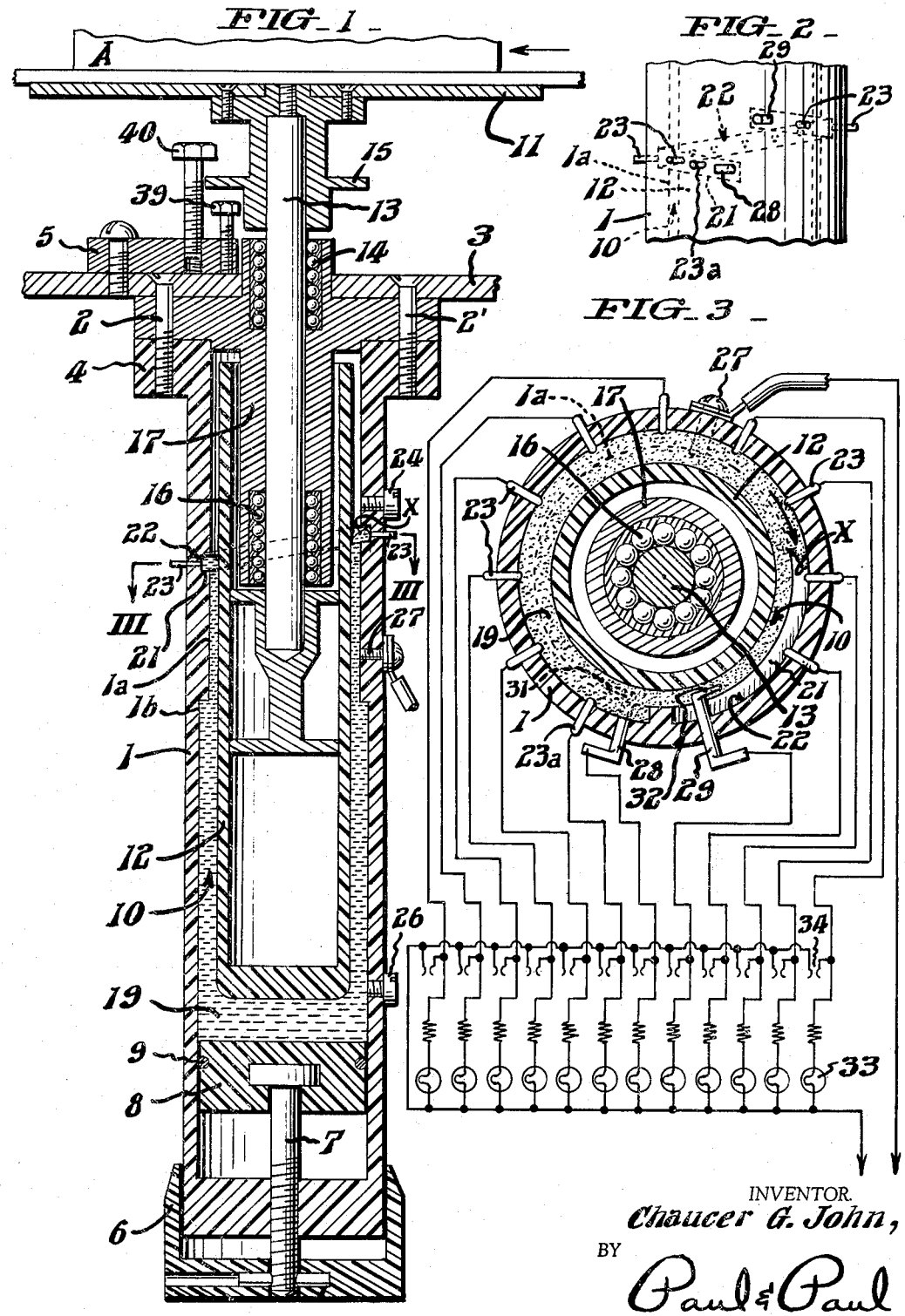
INVENTOR.
Chaucer G. John,
BY
Paul & Paul
ATTORNEYS.

United States Patent Office 3,216,517
Patented Nov. 9, 1965

3,216,517
FORCE MEASURING DEVICE
Chaucer G. John, R.F.D. 2, Box 246, Sebring, Fla.
Filed Apr. 30, 1964, Ser. No. 363,919
9 Claims. (Cl. 177—207)

The present invention relates to measuring devices and more particularly to a device which responds to the magnitude of an applied force by electrical means.

In the weighing art, for example, it is desirable to have an apparatus which is capable of responding quickly to the force applied to it and is also capable of responding in a directly proportional manner to different amounts of applied force. In the past some devices have been employed which will respond rapidly to measure an applied force. Many of these devices have suffered from limitations inherent in their structure and have proved themselves unreliable in measuring small variations in the amount of force applied to them. Further, such devices have usually required external dampening mechanisms for decreasing the time necessary for the device to reach equilibrium before measuring successively applied forces. Such external dampening devices were often costly and unsatisfactory in practice.

It is therefore an object of this invention to provide an electro mechanical transducer device in which the response of the mechanism to the weight of the object is directly proportional to the weight of the object and is substantially unaffected by vibration and is free of variations as occur in springs, variable electrical resistance devices, frictional resistance devices, circuit amplification devices, pivoted levers and the like.

The foregoing and further objects and advantages of this invention will be apparent from the following description and drawings.

The transducer of the present invention provides a means for obtaining separate well defined signals produced by the movement of a single moving part. The moving part comprises a float and means for applying the force to be measured to said float. The float is located in a chamber containing a non-wetting, electrically conducting liquid such as, for example, mercury. Application of force to the float causes the mercury in the chamber to be displaced and rise. The rise of the liquid due to the novel feature of this invention energizes electrical circuitry which is provided to incrementally signal the amount of the force exerted upon said float. As will be apparent hereinafter, the transducer of this invention is so constructed that variations in weight are indicated in a linear manner and the rise of displaced liquid in the float chamber is recorded speedily, accurately and with great sensitivity. The transducer is also self dampening and therefore able to respond rapidly and accurately to successive applications of force.

The measurements contemplated are achieved by providing the interior wall of the float chamber with a pitched groove. The aforementioned electrical circuitry may be connected to electrical contacts provided in the recessed portion of said groove and the circuitry is designed to be actuated when the liquid in the groove rises. As the liquid rises it may make successive contact with the electrical connections provided thereby registering the amount of force applied or the difference between successively applied forces. The provision of the interior wall of the float chamber with a groove and electrical connections takes advantage of an unusual phenomenon which will only occur with liquids which will not wet the wall of the float chamber. As the float is depressed due to the force exerted upon it, the liquid level will rise in the float chamber. As the rising liquid encounters the groove in the chamber wall, a wave or crest will form in the recess of the groove and precede the rise of the main body of the liquid in the groove. In this manner discrete successive electrical contact is made between the electrical connectors and the wave or crest of mercury without the drawback of arcing which would normally be experienced between closely spaced contacts and the main body of the electrically conducting liquid. In this manner also the volume of mercury displaced to achieve electrical contact is substantially constant and therefore the response of the wave or crest to the downward force applied to the float is substantially linear with respect to the force applied.

Referring now specifically to the drawings:

FIGURE 1 is a cross-sectional view of the transducer according to this invention.

FIGURE 2 is a fragmentary view of the float chamber illustrating the pitched groove and fixed electrical contacts.

FIGURE 3 is a staggered diagrammatic horizontal cross-section taken at the lines and arrows III—III in FIGURE 1 showing the wave or crest of mercury responding to the downward force exerted upon the float of FIGURE 1.

In the cross-sectioned view of the transducer according to this invention in FIGURE 1 the assembly is made up of a cylinder 1 which is attached by means of fasteners 2 and 2' to a fixedly mounted base plate 3 and which is provided with a flange 4 for attachment to said base plate 3 by said fasteners 2 and 2'. This base plate 3 may be mounted on a suitable base structure (not shown) or may be the component of a machine. The lower end of cylinder 1 is preferably closed and adapted to be covered by adjusting cap 6 to which is attached threaded bolt 7 which communicates through the bottom of said cylinder 1 and is positioned with respect to a piston 8 located within said cylinder 1 and intimately in contact with the walls thereof by O-ring so as to provide adjustment for the level of fluid material within said cylinder 1 by turning adjusting cap 6 which in turn will control the movement of piston 8 within said cylinder 1. Said transducer is further provided with a weighing table 11 which is attached to float 12 by means of rod 13. Rod 13 is provided for reciprocal motion by means of bearings 14 and 16 which are journaled to flanged support 17 which communicates through base plate 3 and is fastened thereto integrally with cylinder 1. The flange support 17 is recessed at its upper and lower end portions to receive bearings 14 and 16. Rod 13 is adapted to ride within the bearings 14 and 16 and is rigidly connected in any suitable manner to the cylindrical float 12. The float 12 is concentric with the inner wall of the cylinder 1 and is spaced therefrom so that a chamber 10 is formed and in this chamber is carried a bath of mercury 19 for receiving the float 12. Rod 13 imparts the capacity for reciprocal motion to float 12 which is disposed within cylinder 1 and floats on non-wetting liquid 19. The dimensions of the transducer according to this invention are chosen so as to permit a given range of weights or forces such as shown at A applied to the table 11 to move float 12 in a downward manner thus causing the liquid level of 19 to rise between the exterior wall of said float 12 and the interior wall of cylinder 1. In the critical area where electrical contact is to be made according to this invention the interior wall of cylinder 1 is dimensioned at 1a so as to take maximum advantage of the rapid recovery of the device between successive weighings and at the same time achieve the required sensitivity of the transducer according to this invention. Located at a predetermined location on the inner wall at 1a is the pitched helical groove 22. This groove can be cut of any cross-sectional shape desired as long as its dimensions are uniform and the pitch of the groove may vary from anything above horizontal to anything less than vertical. Disposed at the rear wall of this groove are electrical connectors 23. In addition to the foregoing structure, inlet and outlet taps 24 and 26 respectively permit the easy filling of the interior of cylinder 1 with a non-wetting liquid 19 and easy removal of said liquid 19. In the preferred embodiment shown, the non-wetting liquid 19 is mercury and the electrical circuitry employed as shown in FIGURE 3 depends upon electrical connection between the main body of the mercury 19 and successive electrical contacts located in the groove 22. Therefore, electrical connector 27 is communicating through the wall of cylinder 1 making electrical contact with mercury 19 to permit the flow of eletcrical energy as the successive electrical contacts are made. The electrical circuits described are supplied by any suitable source of electrical power.

FIGURE 2 illustrates a fragmentary view of the cylinder 1 showing the pitched helical groove 22 in the interior of the wall of cylinder 1, said groove being provided with electrical connectors placed at predetermined locations through the external wall of cylinder 1 and provided for electrical contact at the rear wall of the groove 22. This view clearly shows how the vertical distance between successive electrical contacts can be made to be of a very small magnitude without the normally attended danger of arcing to the main body of fluid.

FIGURE 3 is a staggered cross-sectional view taken along the lines and arrows III—III of FIGURE 1 representing the entire cross-section of the cylinder 1. In this figure the groove 22 is shown partially filled by mercury as the float 12 is depressed into cylinder 1 by a force exerted on rod 13. Groove 22 and its shoulder 21 are clearly shown. The wave or crest of the advancing non-wetting liquid is shown at X as it moves in the direction indicated by the solid arrow. In FIGURE 3, electrical contact has been made with all of the shown connectors except two. An optional overriding device is shown by the levers 28 and 29 which communicate with the annular space between the float 12 and the cylinder 1 and can be rotated so that contacts 31 and 32 can be brought into electrically conducting relationship to produce an emergency single contact type of transducer device in the event that a malfunction in the normal circuitry requires maintenance attention. In this manner no unnecessary delays need be encountered during operation.

The electrical circuitry shown in FIGURE 3 is of a conventional type and the transducer according to this invention can be connected with any suitable circuitry to take advantage of its inherent capabilities. In FIGURE 3 the circuitry is completed simply by the mercury which is energized through the connector 27 making contact with individual electrical contacts such as 23. In addition, the movement of the piston 12 is restricted by the assembly cooperating with rod 13. Limit screws 39 and 40 are carried by suitable member 5 mounted on base plate 3 and so arranged to engage flange 15 fastened to rod 13. These limit screws are adjustable to limit the movement of the piston 12 and platform 11 to a predetermined maximum deflection both upwardly and downwardly. The circuit thus made may be adapted to actuate any supporting apparatus such as alarm bells or rejection machinery for removing a package of improper weight from a conveyor belt or the like and is merely represented here as lighting lamps such as lamp 33 and being provided with jacks such as outlet 34 from which information may be sensed as to the calibrated force exerted upon the float of the transducer. When the platform 11 is subjected to the weight of a package, the piston rod 13 and the float 12 will be depressed and cause the mercury 19 to be displaced in accordance with the force exerted by the package on the platform. As the mercury rises in response to the downward force exerted by the package it rolls over the lower corner or shoulder 21 of the spiral groove 22 and engages the lowermost conductor. As the mercury rises it energizes successively the contacts shown in FIGURE 3 in a clockwise direction beginning with connector 23a until the mercury has risen its full amount.

At the region where the surface of the rising mercury enters the spiral groove 22 the surface of the mercury becomes somewhat Z-shaped in cross-section due to its inherent cohesion in the non-wetting property of the liquid mercury as it contacts the material forming the interior of the cylinder 1. Thus, as the mercury rises it flows over the lower edge or shoulder of the groove and upward along the groove in an advancing wave or crest. Such wave or crest first engages the bottom and side portion of the lowermost contact and due to the configuration of the crest or wave and the groove itself it is therefore below and diametrically away from the next higher contact in the groove. Thus, each contact is independently engaged and this results in assuring a clear distinct signal for each contact as it is engaged. In the preferred embodiment of this invention the horizontal width of the shoulder of the groove 22 should be greater than the vertical distance between the adjacent contact points. In addition, it will be seen that the outside diameter of the float and the inside diameter of the float chamber depend upont he requirements of the specific application to which the transducer is applied. For example, the successive contacts to be engaged in the contact channel may vary as little as .002" vertically whereas circumferentially they may be spaced 0.10" or more. Also the width of the lower shoulder of the helical groove should preferably be from 0.03" to 0.05" or more to permit the mercury to make good contact with a lower electrical connector before it rises to engage the next higher electrical connector.

It should be noted that the interior of cylinder 1 at 1b is of a larger diameter in order to lessen the frictional resistance of the mercury so that the proper dampening effect is obtained for the operational speed desired for the float in the transducer. By having the upper portion of the float chamber 10 of uniform diameter and uniformly spaced from the float it will be seen that vertical rise of the mercury due to the depression of the float by weight or downward force on the platform 11, the mercury will be forced to rise an equal amount for each additional equal increment of weight. The length of the lengthened portion of the float chamber 10 and the spacing from the float may be varied and also the pitch of the spiral groove and the number and spacing of the electrical contacts may be varied to readily obtain readings caused by the movement of the mercury for indicating small differences between successively applied forces.

Although this invention has been described with respect to specific embodiments thereof, it will be appreciated by one skilled in the art that the invention is broad enough to encompass all equivalent embodiments thereof without departing from the spirit and scope of the invention as set forth in the foregoing specification and the appended claims.

Having thus described my invention, I claim:

1. A force measuring device comprising means for proportionally converting a force to be measured into the displacement of mercury, container means for containing the displacement of the mercury, said container means being symmetrically shaped and provided with a helical groove-like recess of uniform cross-section, positively pitched with respect to the mercury level in said container means, at least part of said recess arranged so as to be in contact with said mercury when said mercury is in a displaced condition; said recess further provided with electrical sensing means for signalling the relative position of the mercury advance in said recess during the displacement of the mercury.

2. A force and linear motion transducer for indicating the downward pressure of objects, said transducer comprising a float chamber containing a bath of mercury, a float disposed in the chamber for receiving the downward pressure of objects and having its exterior wall slightly spaced from but similar in shape to the inner wall of the chamber, an upper extension of the float rigidly secured thereto and guided for vertical movement relative to the chamber whereby said float may cause vertical movement of the mercury in the space between the float and the chamber, an ascending groove disposed along the inner wall of the chamber forming a ledge between the inner wall and the groove, a series of electrical contacts projecting through the wall of the chamber adjacent to the groove for engagement by the mercury as it rises in the groove due to downward movement of the float, said series of contacts being disposed on the interior wall of the groove so that each successive contact is spaced both vertically above and horizontally away from the contact next beneath, whereby displacement of the mercury by downward movement of the float will cause a portion of the mercury to advance in the groove before the advance of the level of the mercury in the chamber to first engage the lowermost contact and then to progressively engage the contacts thereabove for establishing an electrical circuit to indicate the contacts engaged by the mercury in the groove, a source of electrical energy, and leads connecting said source to each of said contacts and to the mercury bath to energize the circuit through each lead as each contact is engaged by the rise of the mercury in the groove.

3. The force and linear motion transducer of claim 2 characterized in that said float chamber is symmetrically shaped.

4. A force and linear motion transducer for indicating successively the downward pressure of each of a series of objects, said transducer comprising an upright cylindrical float chamber containing a bath of mercury, a float disposed in the chamber and having its exterior wall concentric with and slightly separated from the inner wall of the chamber, a rod rigidly secured to the float and guided for the vertical movement relative to the chamber to cause rise and fall of the mercury in the space between the float and the chamber as force is applied vertically to said rod, a helix-like groove disposed around the inner wall of said container communicating with said chamber, a series of electrical contacts projecting into said groove for engagement by the mercury as it rises in said groove due to downward pressure on the platform, rod and float, said series of contacts being disposed so that each successive contact is spaced both upwardly and circumferentially away from the next adjacent lower contact, whereby the displacement of the mercury by the float will cause the mercury to rise in said chamber and in said groove to thereby engage the lowermost contact and progressively engage the contacts thereabove for establishing an electrical circuit to indicate the contacts in engagement with the mercury, a source of electrical energy, and leads connecting said source to each of said contacts and to the mercury bath to energize the circuit through each lead as each contact is engaged by the rise of the mercury in the groove.

5. A transducer for indicating successively the downward pressure of objects, said transducer comprising an upright cylindrical float chamber containing a bath of mercury, a float disposed in the chamber and having its exterior wall concentric with and slightly separated from the inner wall of the chamber, a rod rigidly secured to the float and guided for the vertical movement relative to the chamber to cause rise and fall of the mercury in the space between the float and the chamber as force is applied vertically to said rod, an ascending groove disposed in the inner wall of the float chamber at an angle to the surface of the mercury of less than 90 degrees and capable of being engaged by the rise of the mercury due to the downward pressure of an object, a series of electrical contacts projecting radially through the wall of the chamber and into said ascending groove disposed on the inner wall of the float chamber for engagement by the mercury as it rises due to downward pressure on the rod and thereby the float, said series of contacts being disposed so that each successive contact is spaced both upwardly and circumferentially away from the next adjacent lower contact, whereby the displacement of the mercury by the float will cause the mercury to engage the lowermost contact and progressively engage the contacts thereabove for establishing an electrical circuit to indicate the contacts in engagement with the mercury, a source of electrical energy and leads connecting said source to each of said contacts and to the mercury bath to energize the circuit through each lead as each contact is engaged by the rise of the mercury.

6. A transducer according to claim 5 in which the walls of the ascending groove are disposed substantially normal to the inner surface of the float chamber to form shoulders between the walls of the groove and the inner wall of the chamber, and the inner portions of said electrical contacts terminate short of the shoulder portions of the groove.

7. A transducer according to claim 6 in which the inner portions of said electrical contacts are disposed above the lower shoulder of the groove.

8. A force measuring device for proportionally converting a force to be measured into electrical information comprising:
    a container having inner and outer wall surfaces;
    displacement means located within the container and adapted for reciprocal vertical movement;
    a non-wetting electrically conducting fluid contained in the container in contact with the displacement means and adapted to be displaced vertically upward along the inner wall of the container by the application of force to the displacement means;
    an ascending groove located along the inner wall of the container between the inner and outer walls of the container and communicating with the interior of the container to form a ledge, the groove and ledge adapted, formed and angled with respect to the level of the fluid to cooperatively receive and carry a portion of vertically moving fluid ahead of the main level of the fluid in the container as force is applied to the displacement means;
    a plurality of electrical sensing means exposed for contact with the fluid within the groove and located horizontally away and vertically above the ledge;
    circuit means electrically connected to the sensing means for producing an electrical indication of contact between the fluid and the sensing means thereby proportionally measuring the amount of force applied to the displacement means by the vertical displacement of the fluid.

9. The force measuring device according to claim 8 wherein the non-wetting electrical conducting fluid is mercury.

References Cited by the Examiner

UNITED STATES PATENTS

| | | | |
|---|---|---|---|
| 403,452 | 5/89 | Batter | 177—207 |
| 841,454 | 1/07 | Sargent | 73—401 |
| 1,014,604 | 1/12 | Messiter | 177—16 |
| 1,638,814 | 8/27 | Epstein | 73—398 |
| 1,838,018 | 12/31 | Furlong | 177—210 |
| 2,869,368 | 1/59 | Brown | 73—304 |

LEO SMILOW, *Primary Examiner.*